Figure 1A:
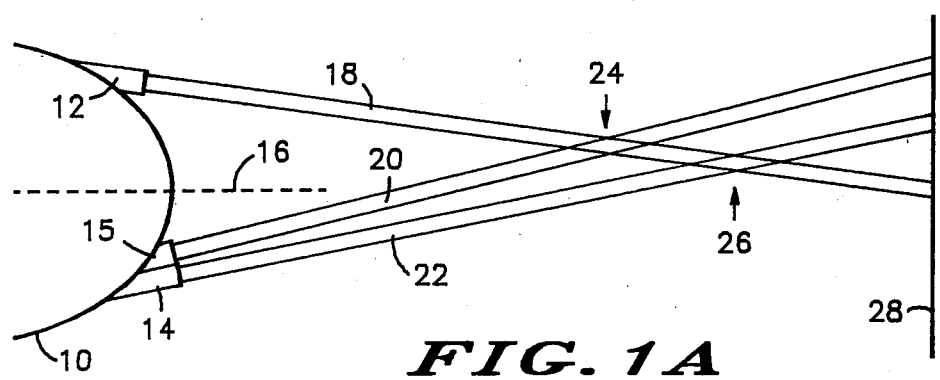

United States Patent [19]

Dahl

[11] Patent Number: 4,709,142
[45] Date of Patent: Nov. 24, 1987

[54] TARGET DETECTION IN AEROSOLS USING ACTIVE OPTICAL SENSORS AND METHOD OF USE THEREOF

[75] Inventor: Randy L. Dahl, Scottsdale, Ariz.

[73] Assignee: Motorola, Inc., Schaumburg, Ill.

[21] Appl. No.: 914,696

[22] Filed: Oct. 2, 1986

[51] Int. Cl.[4] .................. G01V 9/04

[52] U.S. Cl. .................. 250/221; 250/222.1; 356/5

[58] Field of Search .................. 250/221, 222.1; 356/1, 356/4, 5

[56] References Cited

U.S. PATENT DOCUMENTS

| | | | |
|---|---|---|---|
| 2,216,716 | 10/1940 | Withem | 250/221 |
| 3,198,952 | 8/1965 | Benham et al. | 250/221 |
| 4,289,397 | 9/1981 | Itzkan et al. | 356/4 |
| 4,403,142 | 9/1983 | Kondo | 250/221 |

*Primary Examiner*—David C. Nelms
*Assistant Examiner*—Chung K. Seo
*Attorney, Agent, or Firm*—Maurice J. Jones, Jr.; Eugene A. Parsons

[57] ABSTRACT

An active optical sensing device and method which uses a transmitter to transmit directional electromagnetic radiation and a plurality of detecting devices for receiving radiation reflected off of a target and for providing output signals in response thereto. The signals are sent to a logic circuit for processing in time and amplitude to differentiate between a target and an aerosol.

3 Claims, 7 Drawing Figures

TARGET DETECTION IN AEROSOLS USING ACTIVE OPTICAL SENSORS AND METHOD OF USE THEREOF

BACKGROUND OF THE INVENTION

The present invention pertains to a device and method for detecting targets in aerosols using active optical sensors. Used in this context, aerosols means any suspension of solid or liquid particles in air or a gas, such as: mist, fog, dust, clouds. In the prior art, optical sensors are associated with explosive projectiles and are capable of activating circuitry within the projectile which arms or detonates the projectile when it is in proximity to a target. The device generally comprises a source of radiation which directs a narrow beam of radiation towards a target, and a receiver or detector which responds to radiation reflected by the target to the device. The detector provides an output signal in response to the radiation incident thereto. When this output signal reaches a threshold level, the projectile is armed or detonated.

One of the major difficulties with the optical sensor is its inability to discriminate between solid targets and aerosols. When the radiation beam is transmitted, if there are aerosols, between or covering the target, these aerosols will reflect some of the beam. These spurious reflections are picked-up by the sensors causing a premature detonation. In prior art this problem is rectified by trying to minimize the reflections caused by the aerosols. This is accomplished by desensitizing the sensors, a common method of which is to place an opaque mask or field stop in front of the detector. An apperture in the field stop is selectively positioned or sized so as to allow only a particular portion of the reflected radiation to reach the detector. This gives the detector a selected range while preventing short range spurious reflections from aerosols. This has been modified by using a plurality of appertures for different distances. These have some effect in reducing the spurious reflections from aerosols between the target and the projectile but cannot sort out the signal of a target when it is inside a cloud of aerosols.

SUMMARY OF THE INVENTION

The present invention is an active optical sensing device for detecting targets in aerosols. This optical sensing device and method comprises a source directing radiation outwardly from the device toward a target. Radiation reflected from the target is received by a plurality of detectors or sensors in the device. These detectors, upon receiving reflected signals, continually relay these signals to be processed by a logic circuit. This logic circuit determines whether the incoming signals are from a solid target or from aerosols. It is also capable of detecting a target emersed in an aerosol.

It is an object of this invention to provide a new and improved method for detecting a target in aerosols.

It is a further object of this invention to provide a device capable of discriminating between aerosols and opaque targets.

It is an object of this invention to provide a device capable of detecting a target emersed in an aerosol.

These and other objects of the present invention will become apparent to those skilled in the art upon consideration of the accompanying specification, claims and drawings.

BRIEF DESCRIPTION OF THE DRAWINGS

FIG. 1A schematically illustrates transmitting and receiving beam patterns, with a solid target, of a preferred embodiment of the present invention.

FIG. 1B schematically illustrates transmitting and receiving beam patterns, with an aerosol cloud, of a preferred embodiment of the present invention.

FIG. 1C schematically illustrates transmitting and receiving beam patterns, with a target enclosed by an aerosol, of a preferred embodiment of the present invention.

FIG. 2 graphically illustrates the signals from an opague target to the two detectors in this preferred embodiment of the present invention.

FIG. 3 graphically illustrates the signals reflected off an aerosol to the detectors of the preferred embodiment of the present invention.

FIG. 4 is a graphical illustration of signals reflected from a target emersed in an aerosol as detected by the sensors in the preferred embodiment of the present inventiion.

FIG. 5 is a flow chart illustrating the operation of the logic circuit.

DESCRIPTION OF THE PREFERRED EMBODIMENT

Referring now to the drawings wherein like numbers represent like parts, FIGS. 1A, 1B, and 1C each are a drawing of the nose section of a projectile or missile 10 approaching a target 28 and having a transmitter 12 displaced to one side of a longitudinal axis 16 of missile 10 and a set of receivers 14 and 15 displaced to the opposing side for looking ahead of missile 10. Transmitter 12 is positioned for directing a beam of electro-magnetic radiation 18 across the line of flight of missile 10 and towards target 28. The set of receivers 15 and 14 are positioned so that their fields of view 20 and 22, respectively, are non-overlapping and intersect transmitted radiation beam 18 ahead of missile 10. It will be understood by those skilled in the art that receivers 15 and 14 may have access to the reflected radiation via one receiver optics. Windows 24 and 26 are created where fields of view 20 and 22, respectively, are coincident with radiation beam 18.

In operation, missile 10 is moving towards target 28 with transmitter 12 emitting radiation beam 18. Upon contacting a target much of the radiation from beam 18 is reflected back towards missile 10. This radiation is not detected until window 26, which is set at a predetermined distance from the missile, reaches the target, at which time transmitted radiation beam 18 is reflected from the target within the field of view 22 of receiver 14 and is sensed by receiver 14. As missile 10 continues towards target 28, window 26 passes behind target 28 thus effectively stopping reflective radiation from entering field of view 22 and being detected by receiver 14. At this point when radiation, reflected from target 28, reaching receiver 14 is reduced below a threshold level, window 24 reaches target 28 and the reflective radiation passes down field of view 20 to receiver 15. Windows 26 and 24 must be separated by a set distance in order to insure the complete blockage of reflected radiation from receiver 14 before any reflected radiation is detected by receiver 15.

FIGS. 2–4 illustrate the signal returns herein designated 30(A,B,C) and 32(A,B,C), due to reflected radiation, shown in three different examples. Signal 30(A,B,C) is due to radiation beam 18 being reflected back down field of view 22 to receiver 14 and signal 32 (A,B,C) is due to radiation being reflected down field of view 20 to receiver 15. Window 26 is the first window to reach a reflective material, so signal 30(A,B,C) in FIGS. 2-4 is the initial signal followed by signal 32(A,B,C) which occurs when window 24 reaches the reflective material a short time later.

Figure 2:
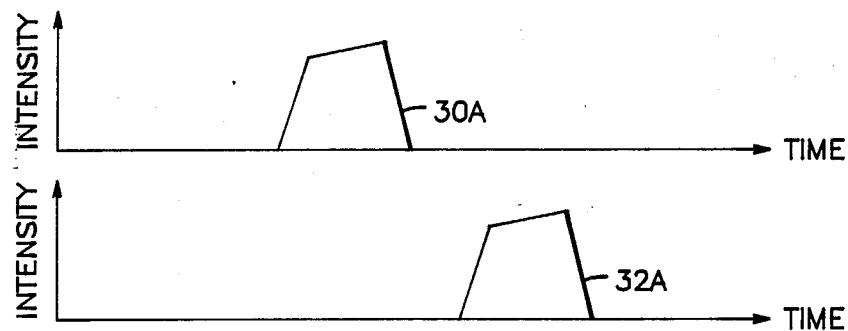

In FIG. 2 signals 30A and 32A are caused by an opaque target. Referring to FIG. 1A, as missile 10 approaches target 28 windown 26 will contact target 28. When this initial contact occurs radiation will be reflected from target 28 down field of view 22 to receiver 14 and signal 30A will increase above the threshold level. As target 28 enters deeper into window 26 the amount of reflected radiation picked-up by detector 14 will increase with signal 30 coinciding with this increase. As window 26 passes through target 28 the amount of reflected radiation picked-up by receiver 14 is greatly reduced until the detected radiation is minimal. Corresponding to this event signal 30A also declines until it is below threshold. When window 26 passes completely through target 28 and no reflected radiation is picked-up by receiver 14 window 24 will contact target 28. A signal 32A identical to signal 30A now occurs, increasing as target 28 enters further into window 24 and decreasing as window 24 passes through target 28, until signal 32A also drops below threshold level. This is the signature for an opaque target with signal 30A dropping below threshold level before signal 32A increases above threshold level.

Figure 1B:
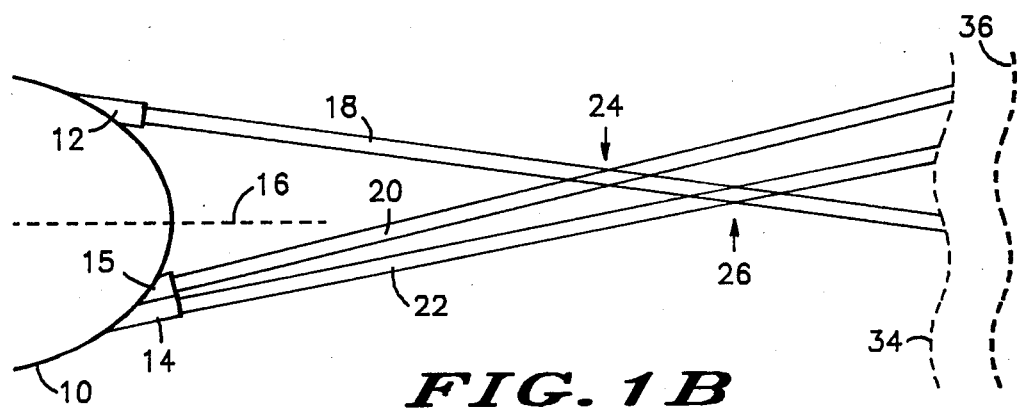
Figure 3:
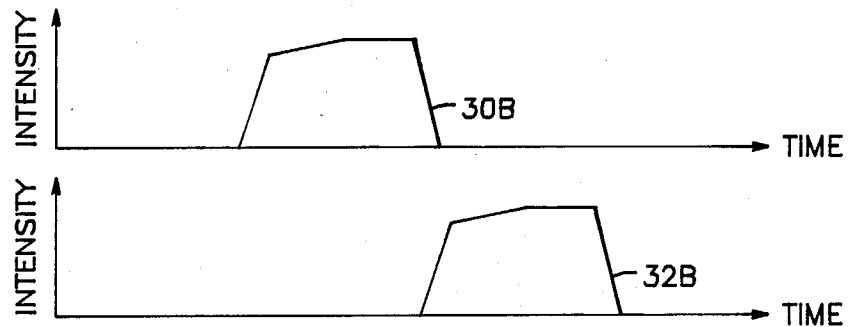

In FIG. 3 signal 30B and 32B are caused by an aerosol. Referring to FIG. 1B as missile 10 approaches the aerosol, window 26 contacts the leading edge 34 of the aerosol and reflected radiation 18 begins to be received by receiver 14 causing 30B to increase above threshold level. As window 26 fully enters the aerosol the radiation picked-up by receiver 14 increases. Signal 30B increases correspondingly. An aerosol has depth and due to this characteristic, radiation will be reflected down field of view 22 for a longer period of time, being cut-off only when window 26 passes completely through the aerosol, past the trailing edge 36 at which time no radiation is reflected down field of view 22. Because radiation is reflected down field of view 22 for a longer period of time, signal 30B is longer and will overlap with signal 32B. That is, window 24 will contact the leading edge 34 of the aerosol before window 26 fully passes through the aerosol past trailing edge 36. This results in a signature for aerosols which has signal 30B decreasing past the threshold level after signal 32B increases above the threshold level. It will of course be understood that the duration of signals 30B and 32B will depend upon the consistency, width, and content of the aerosol.

Figure 1C:
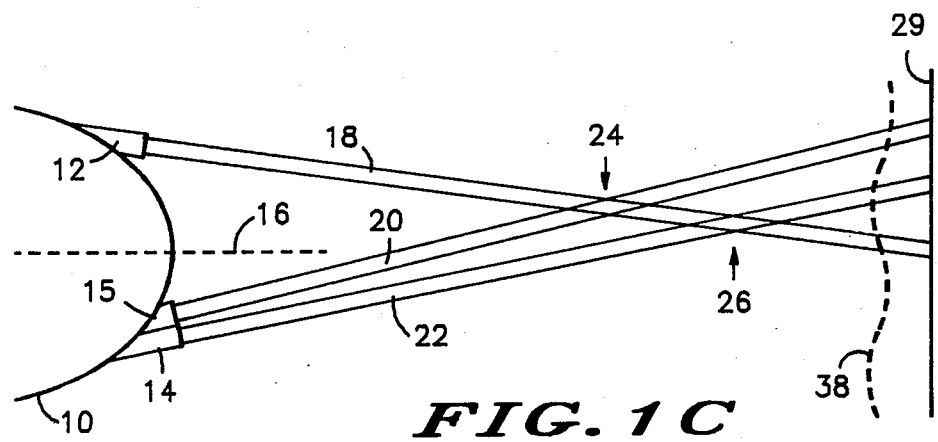
Figure 4:
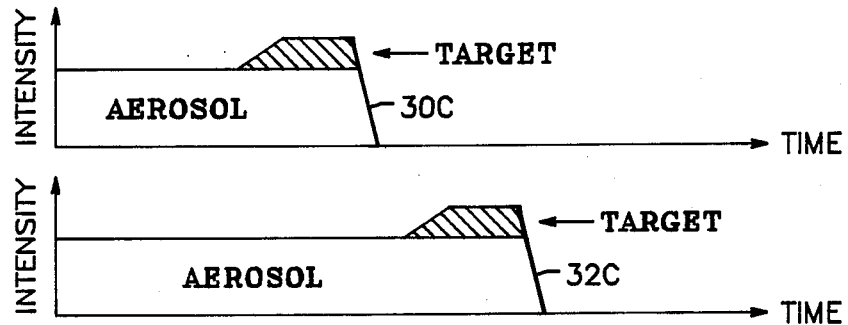

In FIG. 4 signal 30C and 32C are caused by an opaque target obscured by an aerosol cloud. Referring to FIG. 1C, as missile 10 approaches an aerosol obscured target window 26 enters the aerosol cloud 38 causing a signal return 30C. The signal is substantially steady (d.c.) as window 26 travels through aerosol 38 until window 26 contacts target 29 at which time signal 30C increases because the solidity of the target reflects more radiation back to detector 14. As window 26 passes behind target 29 detector 14 stops detecting reflected radiation and the signal drops below threshold level. As signal 30C drops off window 24 reaches target 29 causing an increase in reflected radiation detection with a corresponding increase in the signal. As window 24 passes through target 29 signal 32C also drops below threshold level. The signature for an opaque target in an aerosol is when signal 30C decreases below threshold level at which time signal 32C has an increase due to the detected reflections from the target and then it also decreases below threshold level.

Figure 5:
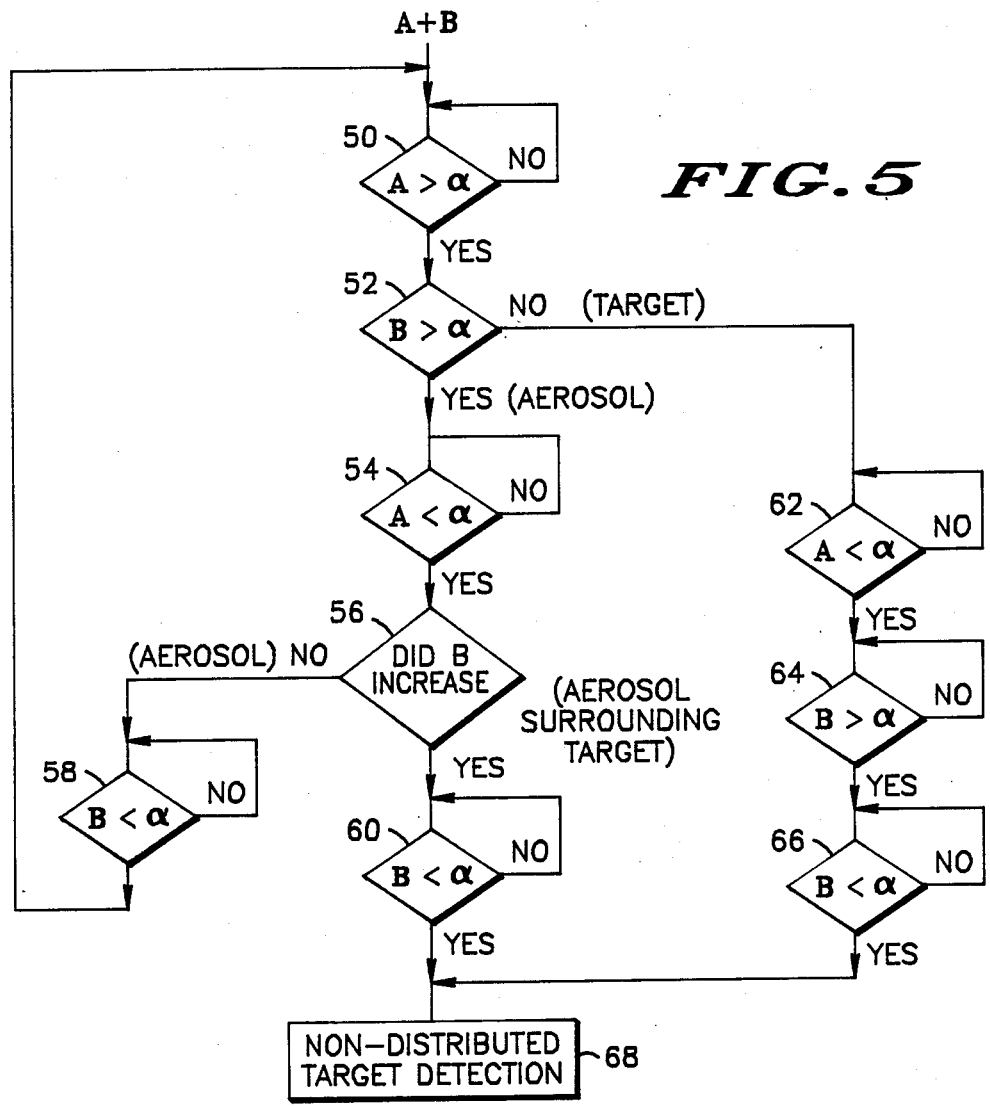

The detonating or arming sequence is initiated when the proper signals are present. The proper initiating signal is determined by a logic circuit as flow charted in FIG. 5. In this flow chart, signals 30(A,B,C) and 32(A,B,C) are designated A and B respectively. In step 1 box 50 if A is greater than the threshold level a reflective substance has been contacted. If A is not greater than the threshold level no reflective substance has been contacted and a loop will continue until A is greater than the threshold level. Step 2 box 52 decides whether the reflective substance is a possible target or an aerosol. If B is greater than the threshold level, while A is greater than the threshold level, then the substance is an aerosol. If B is less than the threshold level then the detector may have contacted a solid target. In step 3 box 54 if the amplitude of A has dropped below the threshold level then B is checked to determine whether the substance is aerosol alone or an aerosol obscuring a target. In box 54 if A is greater than the threshold level a loop continues checking until A falls below theshold level. Step 4 box 56 determines if B increases. If it does not the substance is determined to be an aerosol and moves on to box 58 where it stays until B falls below threshold level. This is the path taken by the signals in FIG. 3.

In box 56 if B increases it is determined that the substance is a target surrounded by an aerosol. Box 60 determines when B falls below threshold level. When B falls below threshold level a non-distributed target has been detected as shown in box 68 and an arming or detonation sequence can begin. This is the path that would be taken by the signals in FIG. 4. If, back at step 2 box 52, B had been less than the threshold level, thus the determination for a target, box 62 would determine whether A was less than the threshold level. If not, a loop sequence would commence until A dropped below threshold level. Box 64 determines if B is greater than the threshold level at the time A drops below the threshold level, and subsequently, box 66 determines when B falls below threshold level. When this happens a non-distributed target has been detected shown as box 68 and a detonation or arming sequence is initiated. The signals in FIG. 2 would follow this path.

Thus, the problem of detecting targets in the neighborhood of aerosols is circumvented.

While we have shown and described specific embodiments of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. An active optical sensing device comprising:
a transmitter for transmitting directional electro-magnetic radiation;
first and second receiving devices with non-overlapping directional fields of view, for receiving directional reflected radiation of said electro-magnetic radiation in a series, and for providing first and second individual output signals in response thereto; and logic means for processing said first and second signals including determining a time of increase above a threshold of the second signal and a time of decrease below the threshold of the first signal, and comparing the determined times to differentiate between a target and an aerosol in accordance with the following, when the time of increase above the threshold of the second signal occurs after the time of decrease below the threshold of the first signal the first and second signals are reflected from a solid target and when the time of increase above the threshold of the second signal occurs before the time of decrease below the threshold of the first signal the first and second signals are reflected from an aerosol, and to initiate a function sequence.

2. A method of differentiating between an aerosol and a target comprising the steps of:

producing directional electro-magnetic radiation;

receiving directional reflected radiation of said electro-magnetic radiation in a series, and providing first and second individual output signals in response thereto;

processing said first and second signals in time and amplitude to differentiate between a target and an aerosol including determining a time of increase above a threshold of the second signal and a time of decrease below the threshold of the first signal, and comparing the determined times to differentiate between a target and an aerosol in accordance with the following, when the time of increase above the threshold of the second signal occurs after the time of decrease below the threshold of the first signal the first and second signals are being reflected from a solid target and when the time of increase above the threshold of the second signal occurs before the time of decrease below the threshold of the first signal the first and second signals are being reflected from an aerosol.

3. The method of claim 2 wherein the step of processing further comprises comparing a substantial increase in said second signal, when the increase above the threshold of said second signal occurs before the decrease below the threshold of said first signal, to time of decrease below the threshold of said first signal to determine one of, time of substantial increase after the increase above the threshold, of said second signal occurs before the time of the decrease below the threshold of said first signal, thereby designating an aerosol, and the time of substantial increase, after the increase above the threshold, of said second signal occurs after the time of decrease below the threshold of the first signal thereby designating a solid target enclosed by aerosols.

* * * * *